(12) United States Patent
Martinez et al.

(10) Patent No.: US 9,286,567 B1
(45) Date of Patent: Mar. 15, 2016

(54) SYSTEMS, METHODS AND ARTICLES FOR PROVIDING SUPPORT INFORMATION FOR A SOFTWARE APPLICATION

(71) Applicant: Intuit Inc., Mountain View, CA (US)

(72) Inventors: Roberto M. Martinez, Rowlett, TX (US); Robert D. Johnson, Plano, TX (US); Cynthia Pursell, Plano, TX (US)

(73) Assignee: INTUIT INC., Mountain View, CA (US)

( * ) Notice: Subject to any disclaimer, the term of this patent is extended or adjusted under 35 U.S.C. 154(b) by 334 days.

(21) Appl. No.: 13/755,435

(22) Filed: Jan. 31, 2013

(51) Int. Cl.
*G06N 5/02* (2006.01)
(52) U.S. Cl.
CPC ........................................ *G06N 5/02* (2013.01)
(58) Field of Classification Search
None
See application file for complete search history.

(56) References Cited

PUBLICATIONS

USACE, RMS / QCS Help Resources, RMS Center, Apr. 2011, pp. 1-12.*
http://accountants.intuit.com/tax/lacerte/.
http://community.intuit.com/category/lacerte-community.
http://accountants.intuit.com/support/index.jsp?&section=top&product=lacerte.
http://accountants.intuit.com/support/tax/lacerte/contact.jsp.
http://www.google.com/analytics/.
Getting Started with Word 2007, Microsoft Word 2007.
http://accountants.intuit.com/tax/proseries/.
http://www.taxact.com/.
http://www.turbotax.com/Ip/ty12/ppc/tmp4_5p.jsp?zna=0&srqs=vns&cid=ppc_gg_b_stan_.
http://www.hrblock.com/tax-software/index.html.

* cited by examiner

*Primary Examiner* — Wilbert L Starks
(74) *Attorney, Agent, or Firm* — Vista IP Law Group LLP

(57) ABSTRACT

Systems, methods and articles of manufacture for providing support information for a software application and generating a knowledge database of support information. A computer system generates a page of the software application displayable on a display. The page has a support button selectable by a user. In response to selection of the support button, the computer accesses support information regarding the page from a knowledge database that is separate from the software application. The computer generates a support page displayable on the display which includes the support information from the knowledge database. The knowledge database is updated at least partly based on analytical data regarding user access of the support information.

24 Claims, 12 Drawing Sheets

Fig. 7

SYSTEMS, METHODS AND ARTICLES FOR PROVIDING SUPPORT INFORMATION FOR A SOFTWARE APPLICATION

SUMMARY

Embodiments of the present invention are directed to systems, methods and articles of manufacture for providing support information for a software application and for generating a knowledge database of support information. One embodiment of the present invention is directed to a computer-implemented method for providing support information for a software application. Many software applications are complex, and/or are related to complex subject matter, in which a user may need help to fully and correctly utilize the software application. As just a couple examples, tax preparation software applications include numerous forms, fields, pages, worksheets, functions and calculations for preparing a tax return. Personal finance management software application also include many functions, data input tools, data output and review tools, and planning and management tools. An instruction manual to explain all how to use all of the aspects of software applications may be unwieldy and difficult to use.

As applied to tax preparation software applications, the present invention includes only that part of a method, apparatus, technology, computer program product, or system that is used solely for preparing a tax or information return or other tax filing, including one that records, transmits, transfers, or organizes data related to such filing. The present invention does not include any strategy for reducing, avoiding, or deferring tax liability. As applied to financial management software applications, the present invention includes only that part of a method, apparatus, technology, computer program product, or system that is used solely for financial management, to the extent that it is severable from any tax strategy or does not limit the use of any tax strategy by any taxpayer or tax advisor.

Accordingly, the present invention provides a convenient and powerful way to provide up-to-date, useful support information for a software application. Typically, software applications generate pages for display on a display of a computer (as used herein, a "computer" includes all computing devices such as personal computers, laptops, smartphones, tablet computers, etc.), such as a computer monitor, LCD, or other visual display device. The pages may have fields, selections, buttons, tabs, etc. that a user may use to fill-in in order to input data, navigate around a page and between other pages of the software application, and otherwise utilize and interact with the software application.

The method is implemented on an application computer, including any electronic computing device having a processor, memory, a communication interface and software programming, such as a personal computer, server computer, mainframe computer, portable computer, tablet computer, smartphone, or the like. The application computer may also include multiple computers operably linked together.

In one embodiment, the method comprises the application computer generating a page of the software application displayable on a display. The method may be implemented on a local computer, such that the display is a component of the computer. Alternatively, the method may be implemented on a server system, such as a website server, which is accessible by a client computer through a communication network, such that the display is a component of the client computer, and not the computer performing the method. In the local compute embodiment, the generated page is simply displayed on the computer's display. In the client-server embodiment, the generated page is transmitted from the server system to the client computer through the communication network, such as the internet.

The generated page includes a support button (such as a help button). As used herein, the term support button includes any user selectable item that is displayed on the generated page. For instance, the support button may be a button, a selection that appears when hovering over a certain part or field of the page, a menu item within a menu of functions, or other graphical user interface element that is selectable by a user.

When the support button is selected by the user, the computer accesses support information from a knowledge database. The support information is related to the particular page or an item or field on the page, and provides support information, such as help information, help articles, information regarding any known issues, such as defects or errors, in the software application related to the page, and the like. The knowledge database is not a part of the software application. Instead, the respective support information is linked to the particular support button on the page. The computer then generates a support page displayable on the display which includes the support information from the knowledge database. The support information may then be displayed on the user's computer display.

In another aspect, the method for providing support information may also include a method for generating the knowledge database. In one embodiment, the method comprises a knowledge database computer receiving notification that an issue (such as a possible program defect) exists with the page of the software application. The knowledge database computer may be any of the types of computers described above. Furthermore, the knowledge database computer may be a different computer than the application computer for the method for providing support information described above, or it may be the same computer or they may be integrated together. However, the knowledge database is not a part of the software application, meaning that a change in the support information in the knowledge database does not require an update to the software application.

The knowledge database computer receives support information created by a customer support representative related to the issue on the page. For instance, the knowledge database computer may send a problem report to customer support, and a customer support representative can determine if there is an issue with the software application, and then prepare support information and enter it into knowledge database computer. The computer receives a notification that the support information will be released for publication to users of the software application. The support information is added to the knowledge database and the support information is linked to the support button. If a support button does not already exist for the particular page or field related to the support information, then a support button may be added to the page (e.g. at the particular field) in a software update to the software application.

In another aspect of the present invention, the method of generating the knowledge database may also utilize analytical data to update the support information. The knowledge database computer receives analytical data regarding usage of the support information by users of the software application. For example, the analytical data may include characteristics of the users' access to the support information, such as the number of times the support information is accessed, number of repeat times it is accessed by the same user, and amount of time spent by each user accessing the support information.

The knowledge database computer uses the analytical data to determine the usefulness of the support information to users of the software application based at least in part on the analytical data. The support information may be modified, such as by a customer service representative, and the knowledge database updated with the updated support information. If a software modification is required, the software application can be modified and a software update may be released to correct the issue.

Another embodiment is directed to a support information system for implementing one or more of the described methods for providing support information for a software application and/or generating a knowledge database. The support information system comprises one or more computers operably coupled to each other, each having a processor, memory operably coupled to the processor, a communication interface and software programming. The system may also include servers, data storage devices, and one or more displays. The system is configured and programmed to perform a process according to any of the method embodiments of the present invention, including, for example, a process comprising: (i) generating a page of the software application displayable on a display, the page including a support button displayed directly on the page; (ii) in response to a selection of the support button, accessing support information from a knowledge database regarding the page, the knowledge database not a part of the software application; and (iii) generating a support page displayable on the display which includes the information from the knowledge database.

In another aspect of the support information system, the process may comprise, or further comprise: (i) receiving a notification from a user that an issue exists with the page of the software application; (ii) receiving support information as created by a customer support representative related to the issue; (iii) receiving a notification that the support information will be released for publication to users of the software application; (iv) adding the support information to the knowledge database; and (v) linking the support information to the support button.

Another embodiment of the present invention is directed to an article of manufacture comprising a non-transitory computer readable medium embodying instructions executable by a computer to execute a process according to any of the method embodiments of the present invention, including, for instance, a process comprising: (i) generating a page of the software application displayable on a display, the page including a support button displayed directly on the page; (ii) in response to a selection of the support button, accessing support information from a knowledge database regarding the page, the knowledge database not a part of the software application; and (iii) generating a support page displayable on the display which includes the information from the knowledge database.

In another aspect of the computer readable medium, the process may comprise, or further comprise: (i) receiving a notification from a user that an issue exists with the page of the software application; (ii) receiving support information as created by a customer support representative related to the issue; (iii) receiving a notification that the support information will be released for publication to users of the software application; (iv) adding the support information to the knowledge database; and (v) linking the support information to the support button.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

The foregoing and other aspects of embodiments are described in further detail with reference to the accompanying drawings, wherein:

FIG. 7 is another example of a display of a page of a software application having a support button, according to one embodiment of the present invention;

DETAILED DESCRIPTION OF ILLUSTRATED EMBODIMENTS

Figure 1:
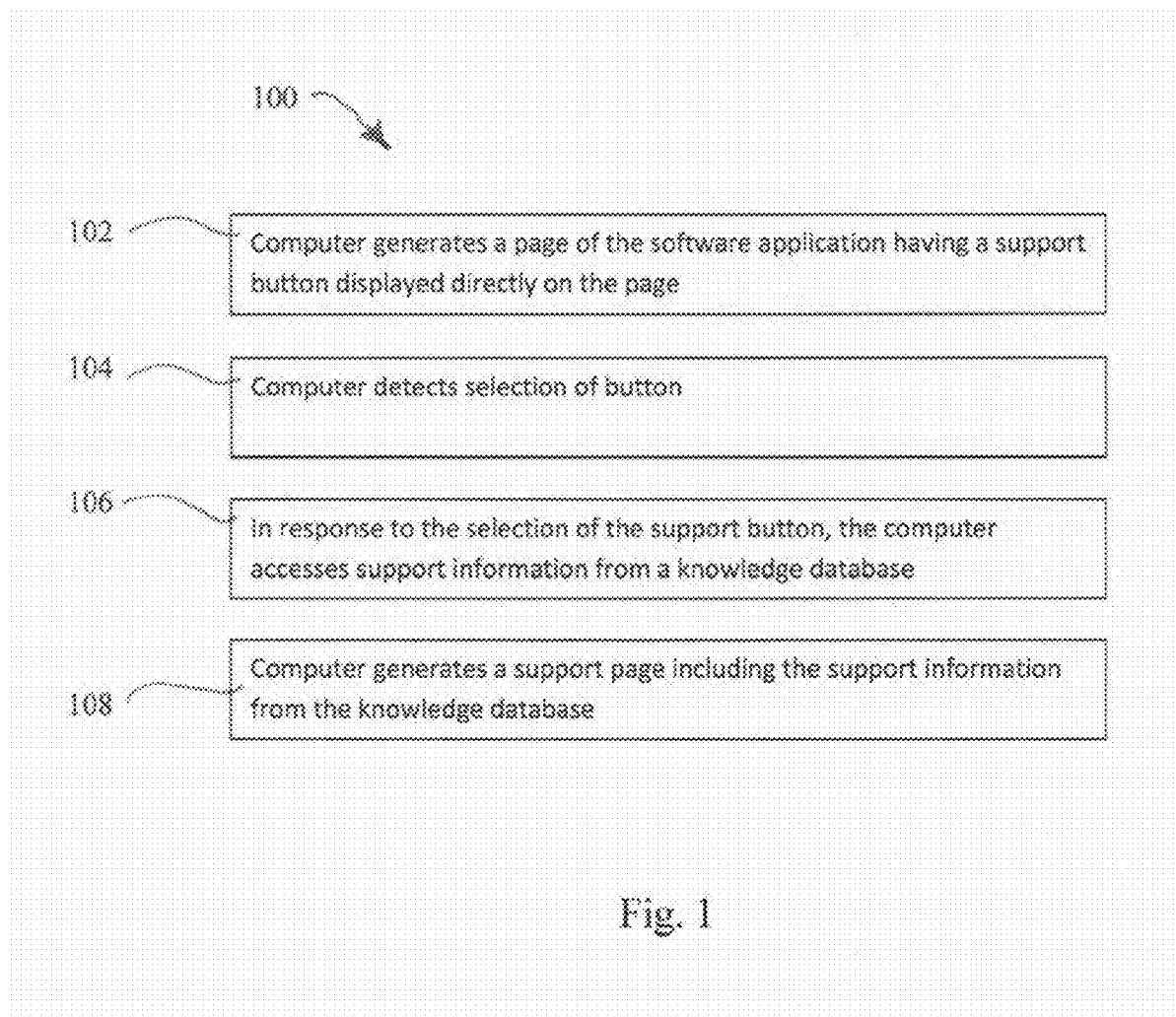
FIG. 1 is a flow chart of a computer-implemented method for providing support information for a software application, according to one embodiment of the present invention.

Embodiments of the present invention are directed to systems, methods and articles of manufacture for providing support information for a software application. Many software application are very complex, and have very sophisticated functionality. An instruction manual, even in electronic form, can be awkward and difficult to use. It can be very hard to find the right information regarding a particular question or issue with the software application, and the information found may not be helpful.

In general, a computer generates a knowledge database regarding a page of the software application through an interactive process between users and customer support for the software application. The knowledge database includes a database of support information that is stored on a storage device. For example, the knowledge database may contain a plurality of support information items on a plurality of topics regarding the software application, such as help information, instructions for using the software application, notices of errors or defects in the software application, hints and advice for using the software application, articles regarding the software application, user comments regarding the software application, etc. The knowledge database is directly accessible from a help button displayed on the page of the software application. For instance, the computer may generate the page of the software application displayable on a display. The page includes a support button displayed directly on the page and the support button is linked to the relevant support information in the knowledge database. In response to a selection of the support button, the computer accesses the support information from the knowledge database regarding the page and generate a support page displayable on the display which includes the information from the knowledge database.

Some examples of complicated software applications are tax preparation applications and personal finance management application. Tax preparation applications include numerous forms, fields, pages, worksheets, functions and calculations for preparing a tax return. Computerized (also referred to as "electronic") tax return preparation applications have become very popular and allow a user, such as a taxpayer or a tax professional, to prepare and electronically file a tax return using a computer. The tax preparation application may be a desktop application that resides and operates on the computer operated by the user or an online application that resides on a server that is accessible by the user's computer via a network such as the internet. The interface for a server based application can be an internet browser or specialized software residing on the local computer. Examples of desktop applications are TurboTax® software for PC and Mac, ProSeries® and Lacerte® tax preparation applications, which are known consumer and professional tax preparation applications available from Intuit Inc., Mountain View, Calif., H&R Block TaxCut software, available from H&R Block, Inc., Kansas City, Mo., and TaxACT® software available from $2^{nd}$ Story Software, Inc. Examples of online tax return preparation applications are Turbotax® Online, H&R Block Online tax prep, and TaxACT® Online.

Whether a desktop application or an online application, the use of the application to prepare a computerized tax return is basically the same. For example, certain tax preparation applications present a list of tax-related questions or data entry fields to the user as a series of interview screens or fillable forms, in response to which the user enters the appropriate data or answers if they are known. For example, certain interview screens or questions may relate to personal and family information such as the user's social security number, marital status, number of dependents, etc. Other interview screens and questions may relate the taxpayer's finances such as wages, retirement plan contributions, and social security, state and federal taxes that were paid or withheld as provided in Form-W2. The data fields of an electronic tax return may be entered in many other ways, as well. For example, data may be entered into the electronic tax return by filling in data fields in a fillable form, the data may be electronically imported from financial service providers of the taxpayer (such as banks, stock brokers, financial planners, etc.), the data may be transferred from another database on the computer or remotely stored on a different computer or storage device/server, and/or the data may be transferred from a previous year's tax return, or from any other suitable source.

Further, an electronic tax return may be a personal return, joint return, or business or corporate return, and the tax-related questions and/or data fields to be completed are customized for the type of tax return and taxpayer.

Upon entry of all of the taxpayer data, the tax preparation application calculates and prepares an electronic tax return. The completed electronic tax return will include the amount of tax payments made by the taxpayer, such as amounts withheld, estimated tax payments, and any tax credits due to the taxpayer. The completed electronic tax return will also include the total income tax due to be paid by the taxpayer. If the amount of tax payments exceeds the total income tax due, then the tax return indicates that a tax refund is due to the taxpayer. If the total income tax due exceeds the amount of tax payments, then the taxpayer owes an additional tax payment. The electronic tax return may then be formatted as necessary and electronically filed with a tax authority such as the Internal Revenue Service, a state tax authority, or other tax collecting entity, or it may be printed and mailed to the appropriate tax authority, or it submitted in any other suitable manner.

Personal finance management software applications also include many functions, data input tools, data output and review tools, and planning and management tools. Personal finance software applications (including online applications) allow a user to organize and track their personal finances. As some examples, Quicken® personal finance software is a desktop and online personal finance software application, available from Intuit Inc., Mountain View, Calif., and Mint® personal finance application is an online application (See the website "mint.com"). Such personal finance applications can perform financial management functions such as managing and paying bills, tracking and managing investments, performing budgeting tasks, viewing and printing summaries and reports, preparing and printing expense reports, writing checks, paying bills with checks or online. The applications can download banking, financial and billing data directly from banks, companies, and financial institutions through a secure internet connection. The applications can create a financial profile of the user in which users can review their financial "picture," review spending and saving habits, create budgets and spending and saving goals, calculate gains and losses on investments, and have reminders set to emphasize dates on which bills or other obligations are to be paid. More sophisticated applications can also manage small business income and expenses, and investment properties. The applications can also compare a user's bank accounts, credit cards, brokerage accounts, and even other service and utility accounts like cellular phone service, cable/satellite TV, gas and electric, with competing accounts to determine if there are more cost effective options.

Personal finance applications may also provide tax information and prepare the personal financial data for transfer into a tax preparation software application.

Figure 4:
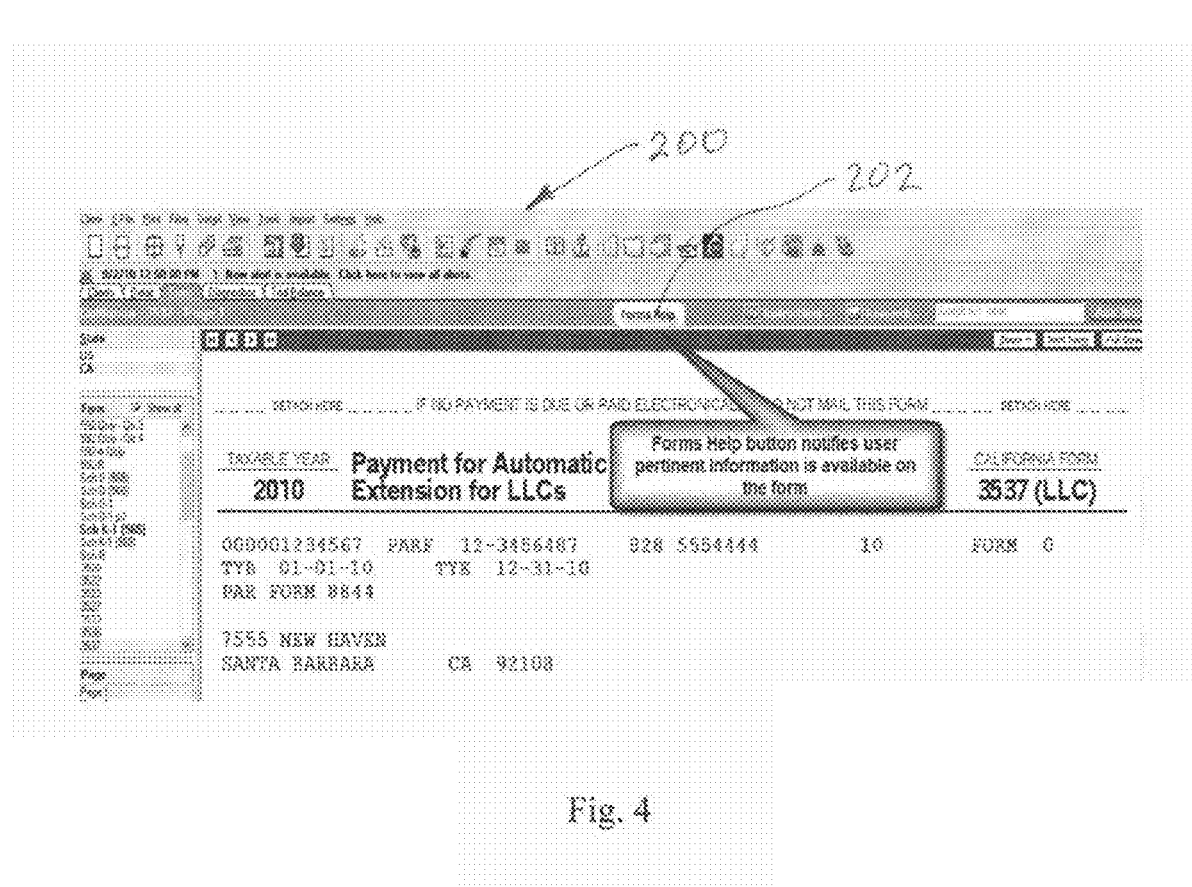
FIG. 4 is an example of a display of a page of a software application having a support button, according to one embodiment of the present invention.
Figure 8:
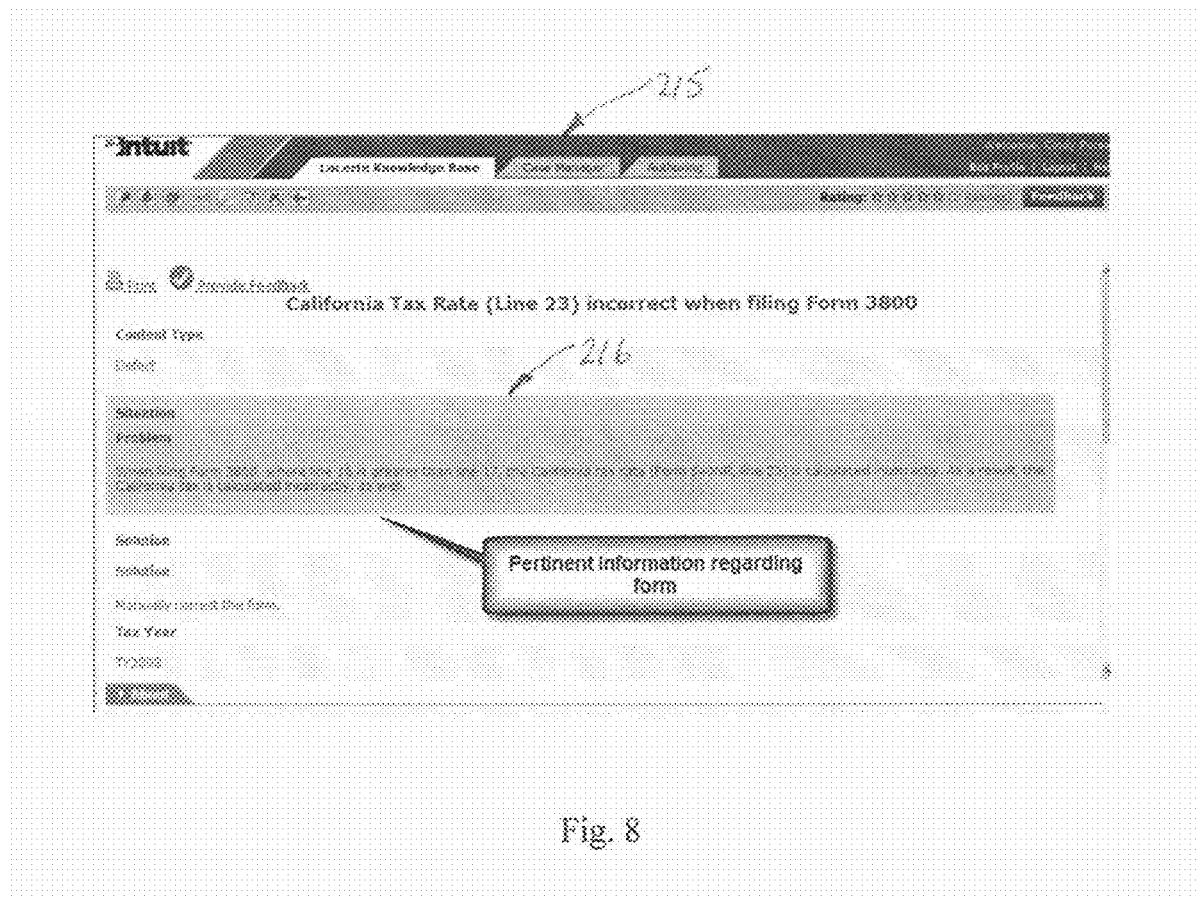
FIG. 8 is an example of a display of a support page for the support button of FIG. 7 which includes information accessed from a knowledge database, according to one embodiment of the present invention.
Figure 9:
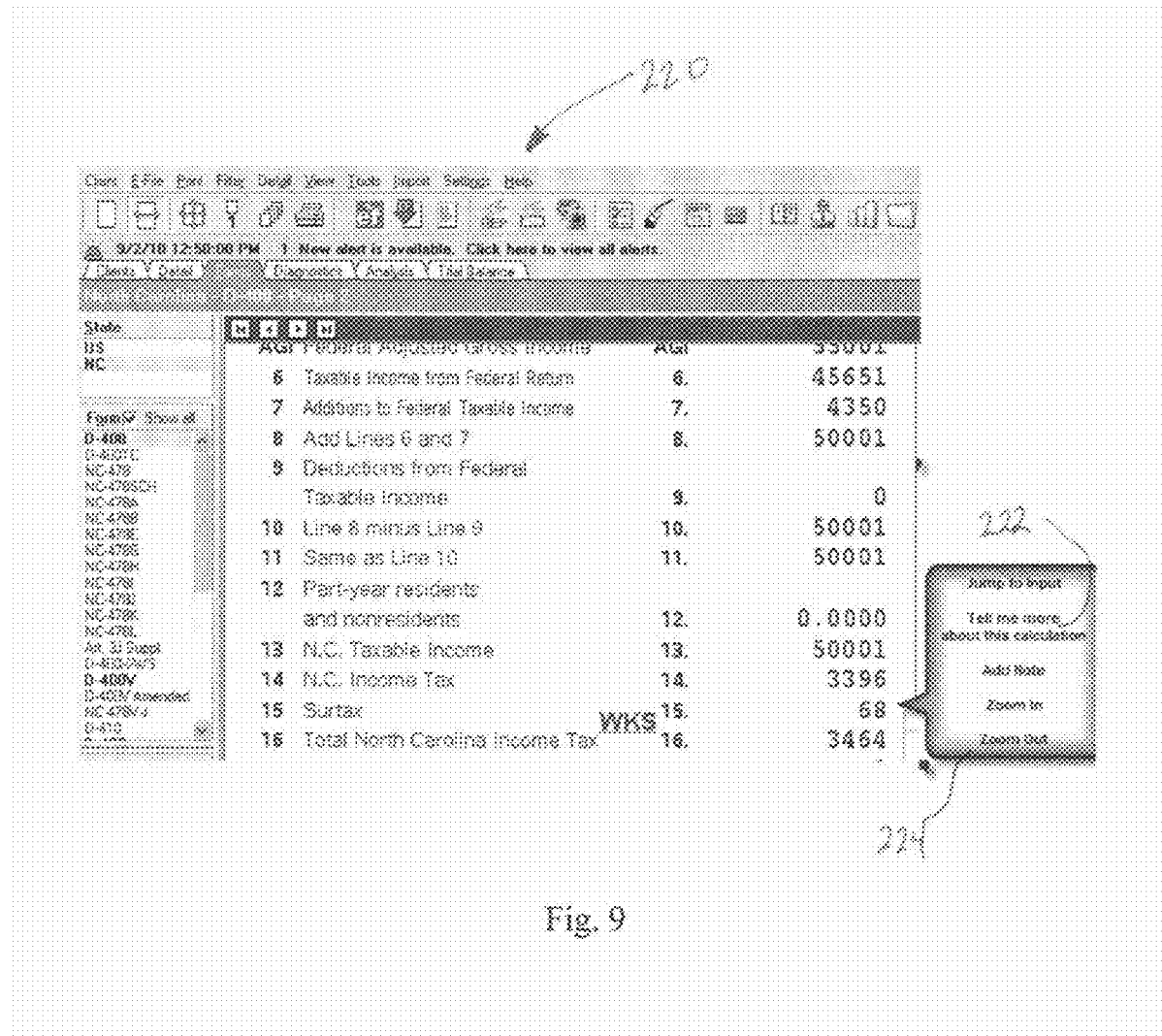
FIG. 9 is another example of a display of a page of a software application having a support button in a menu list, according to one embodiment of the present invention.

Referring to FIG. 1, in one embodiment, a computer-implemented method 100 for providing support information for a software application is shown. The computerized method 100 is implemented on a computer, as described above, which is configured to perform the method 100, such as system 300 shown in FIG. 11, and described in more detail below. At step 102 of the method 100, the software application computer ("the computer") generates a page of the software application that is displayable on a display, such as a computer monitor, LCD, or other suitable electronic visual display device. The method may be implemented on a local computer, such that the display is a component of the computer. The method may also be implemented on a server system, such as a website server, which is accessible by a client computer through a communication network, such that the display is a component of the client computer, and not the computer performing the method. In the client-server embodiment, the generated page is transmitted to from the server system to the client computer through the communication network, such as the internet. Generally, the computer generates the page by executing the software application. FIGS. 4, 7 and 9 show example pages 200, 210 and 220 respectively, generated by the computer executing an exemplary tax preparation application. Although the examples in FIGS. 4-10 are for a tax return preparation application, the present invention is not limited to use with tax preparation applications, and can be utilized with any suitable software application.

Referring to FIGS. 4, 7 and 9, a support button 202 is displayed directly on the page 200, 210, 220. As shown in FIG. 4, the support button 202 is in the form of a button. A typical button is a rectangle or rounded rectangle, with a descriptive caption in its center, in the case of FIG. 4 the words "Forms Help." The most common method of selecting/pressing a button is clicking it with a pointer controlled by a mouse, but other input such as keystrokes can be used to execute the command of a button. While shown as a rectangle, a button not required to be rectangular in shape, but may be circular, triangular, other polygonal shapes, etc. The sole requirement of button interaction is that the user can execute a command by a clicking or selecting the button action. Accordingly, pictures, alphanumeric text, symbols, and other graphical items can be programmed as a button. When pressed, in addition to performing the button function, the button may undergo a graphical change, such as mimicking a mechanical button being depressed, change in color or other change in appearance, and/or an audio signal may be triggered. As shown in FIG. 7, the button 212 is a field 214 (line 31 of the tax form) in the tax form displayed on the page 210. And in FIG. 9, the button 222 is a menu item within a menu 224.

At step 104, the computer detects that a user has selected the button 202, 212 or 214. At step 106, in response to a selection of the support button by a user of the software application, the computer accesses support information form a knowledge database regarding the page, such as a field, item, (or an item, field, text, etc. shown on the page) on which the button appears.

The knowledge database is a database of support information that is stored on a storage device which may be integral to the computer, or separate from the computer and operably linked to the computer by a communication network. The knowledge database is not a part of the software application, such that updating the knowledge database does not require an update or modification of the software application. The knowledge database contains a plurality of support information items on a plurality of topics regarding the software application, such as help information, instructions for using the software application, notices of errors or defects in the software application, hints and advice for using the software application, articles regarding the software application, user comments regarding the software application, etc.

Each of the support information items is linked to one or more of the support buttons 202, 212 or 222 on the pages 200, 210 or 220, respectively, of the software application. For instance, the support button 202 on the page 200 of FIG. 4 may be linked to the support information item reflected in the support information 206 shown on support page 208 shown in FIG. 5. If there are additional support information items related to the page 200, then they may also be linked to the support button 202 on the page 200.

Figure 5:
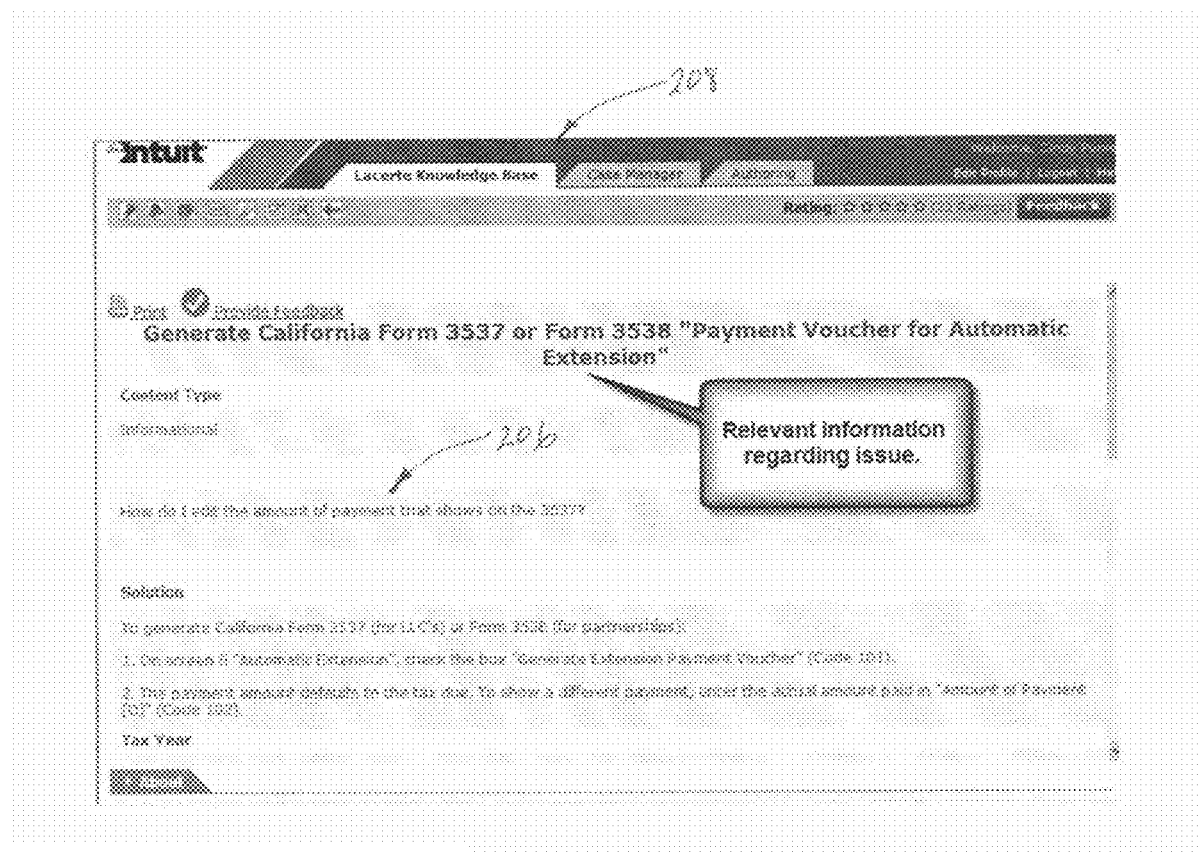
FIG. 5 is an example of a display of a support page for the support button of FIG. 4 which includes information accessed from a knowledge database, according to one embodiment of the present invention.
Figure 10:
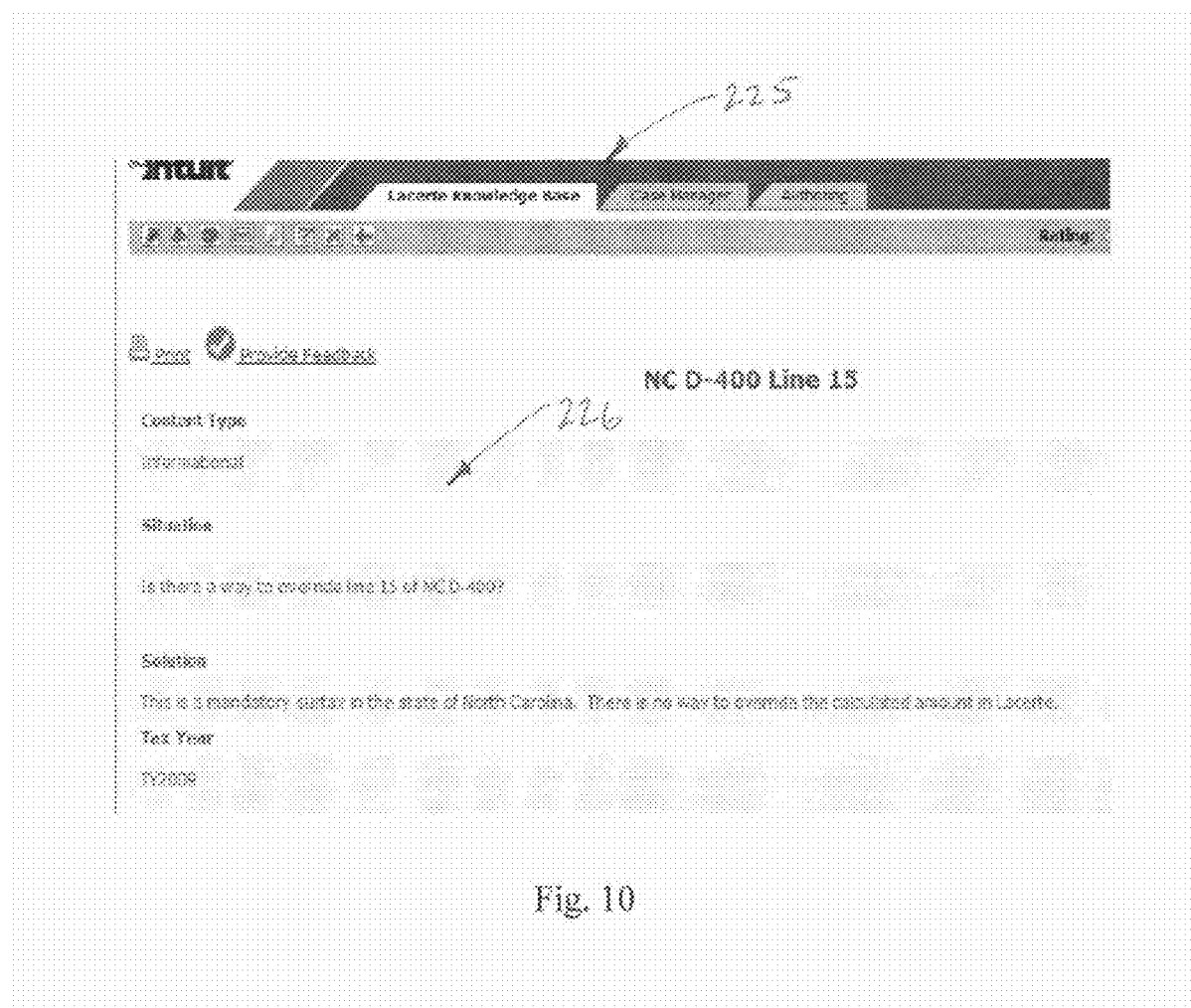
FIG. 10 is an example of a display of a support page for the support button of FIG. 9 which includes information accessed from a knowledge database, according to one embodiment of the present invention.

At step 108, the computer generates a support page including the support information from the knowledge database, the support page displayable on the display. Examples of support pages are shown in FIGS. 5, 8 and 10. In FIG. 5, the support page 205 includes support information 206. In FIG. 8, the support page 215 includes support information 216, and in FIG. 10, the support page 225 includes support information 226.

FIGS. 4-10 show three examples of pages and support pages generated by the computer for a software application, according to the method 100. FIG. 4 shows a display of a page 200 as generated by a tax preparation application. The page 200 shows a California Form 3537 a tax return being prepared by the user utilizing the tax preparation application. The page 200 has a button 202 identified as a "Forms Help" button. The page 200 also shows a "Total Payment Amt" of $3503. A user may select the button 202 by moving a cursor onto the button 202 and clicking on the button 202. In response to selection of the button 202, the computer generates a support page 205. FIG. 5 shows an example of a support page 205 having support information 206 regarding the page 200. In the example of FIGS. 4 and 5, the support information 206 is related to how to edit the amount of payment that shows on Form 3537. The support page 205 explains how the user can edit the amount of payment in the text below the heading "Solution."

Figure 6:
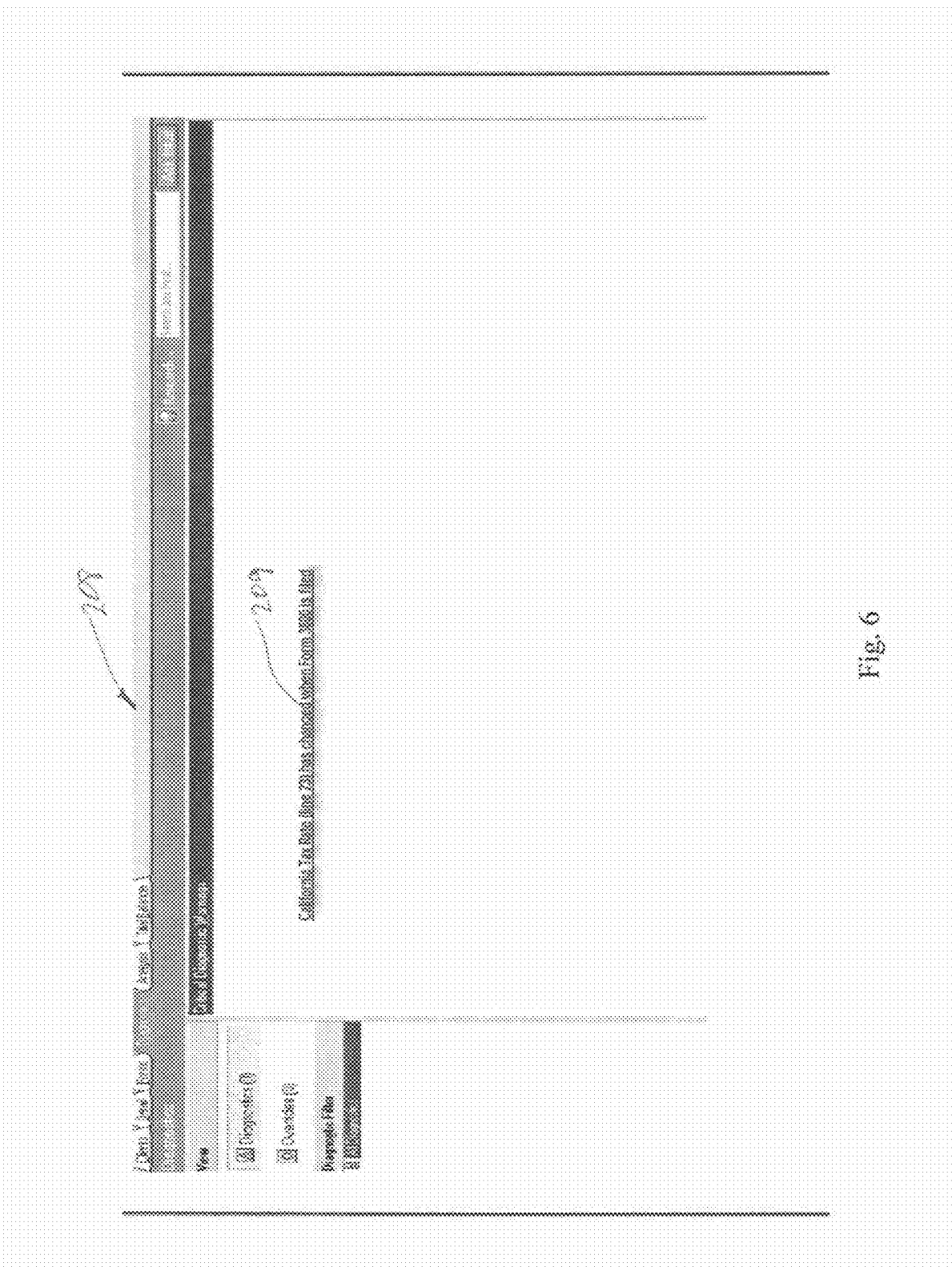
FIG. 6 is an example of a display of a warning page of a software application having a link to the page of the software application shown in FIG. 7, according to one embodiment of the present invention.
Figure 7:
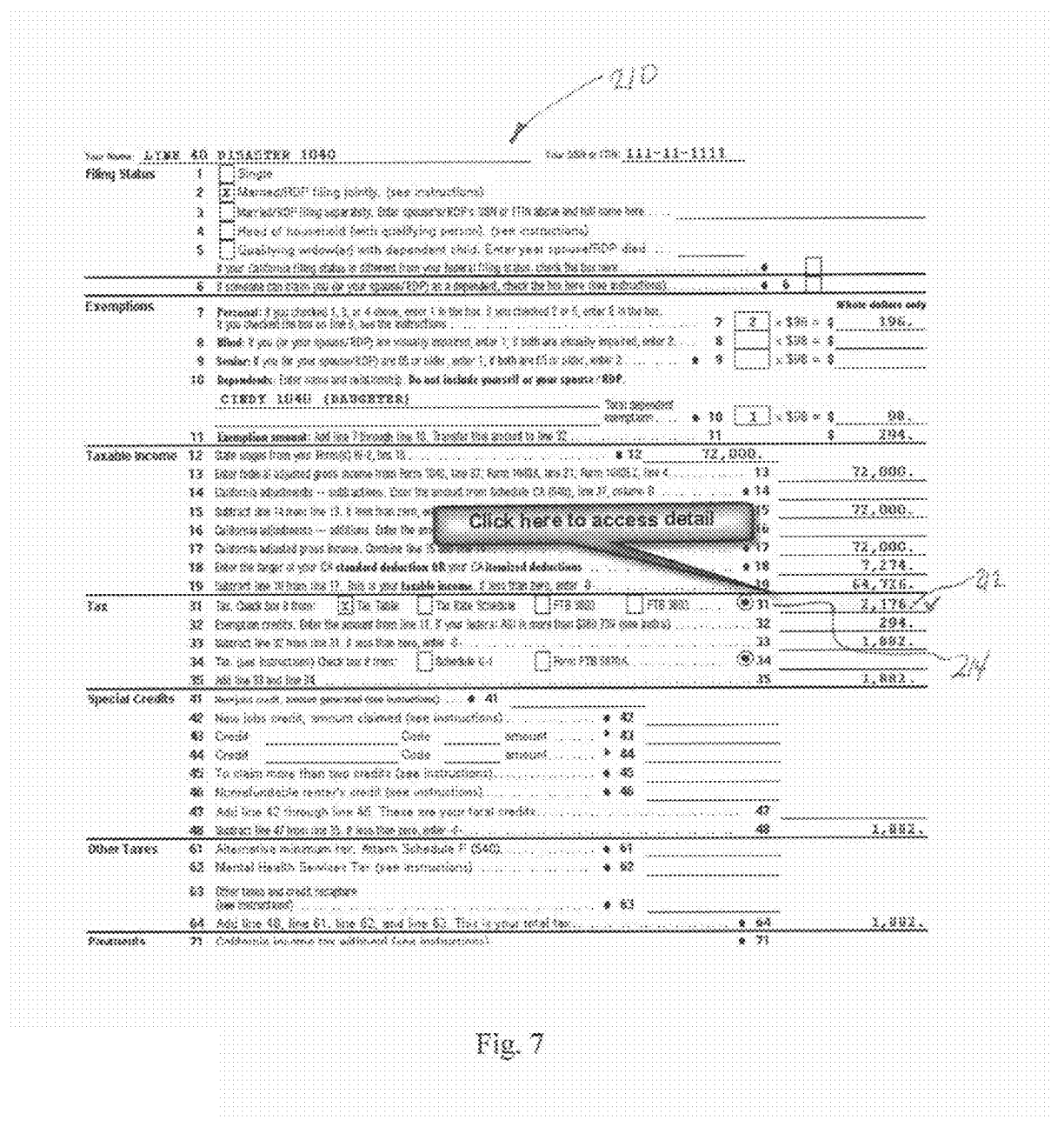

Turning now to the example of FIGS. 6-8, in FIG. 6, the computer may generate a warning page 208 having a warning 209 indicating that there has been a change in the software application, in this case, a change in the California Tax Rate when Form 3800 is filed. The warning 209 is also a link that can be selected. In response to selection of the link 209, the computer generates and/or displays a page 210 of the software application related to the warning 209, as shown in FIG. 7. The page 210 includes a button 212 that is in the form of the field 214 or text ("2,176") at line 31 of the form shown on the page 210. A user may select the button 212 by moving a cursor onto the button 212 and clicking on the button 212. In response to selection of the button 212 by the user, the computer generates a support page 215, as shown in FIG. 8. FIG. 8 shows an example of a support page 215 having support information 216 regarding the page 210. In the example of FIGS. 6-8, the support information 216 is related to a defect in the software application in which a calculation is incorrect for Form 3800. The support information 216 explains the defect, and how the user can correct the defect by manually correcting the form.

FIGS. 9-10 show another example of providing support information using the method 100. FIG. 9 shows a display of a page 220 as generated by a tax preparation application. The page 220 shows a North Carolina income tax form D-400 being prepared by the user utilizing the tax preparation application. The page 220 has a button 222 within a menu 224 for the field or text ("68") at line 15 of the form. The button 222 is identified by the text "Tell me more about this calculation." A user may select the button 222 by moving a cursor onto the button 222 and clicking on the button 222. In response to selection of the button 222, the computer generates a support page 225 as shown in FIG. 10. FIG. 10 shows an example of a support page 225 having support information 226 regarding the page 220. In the example of FIGS. 9-10, the support information 216 is related to whether entry in line 15 of Form D-400 may be overridden. The support page 225 explains that line 15 is a mandatory tax in the state of North Carolina and that the calculated amount in the form cannot be overridden in the tax preparation application.

Figure 2:
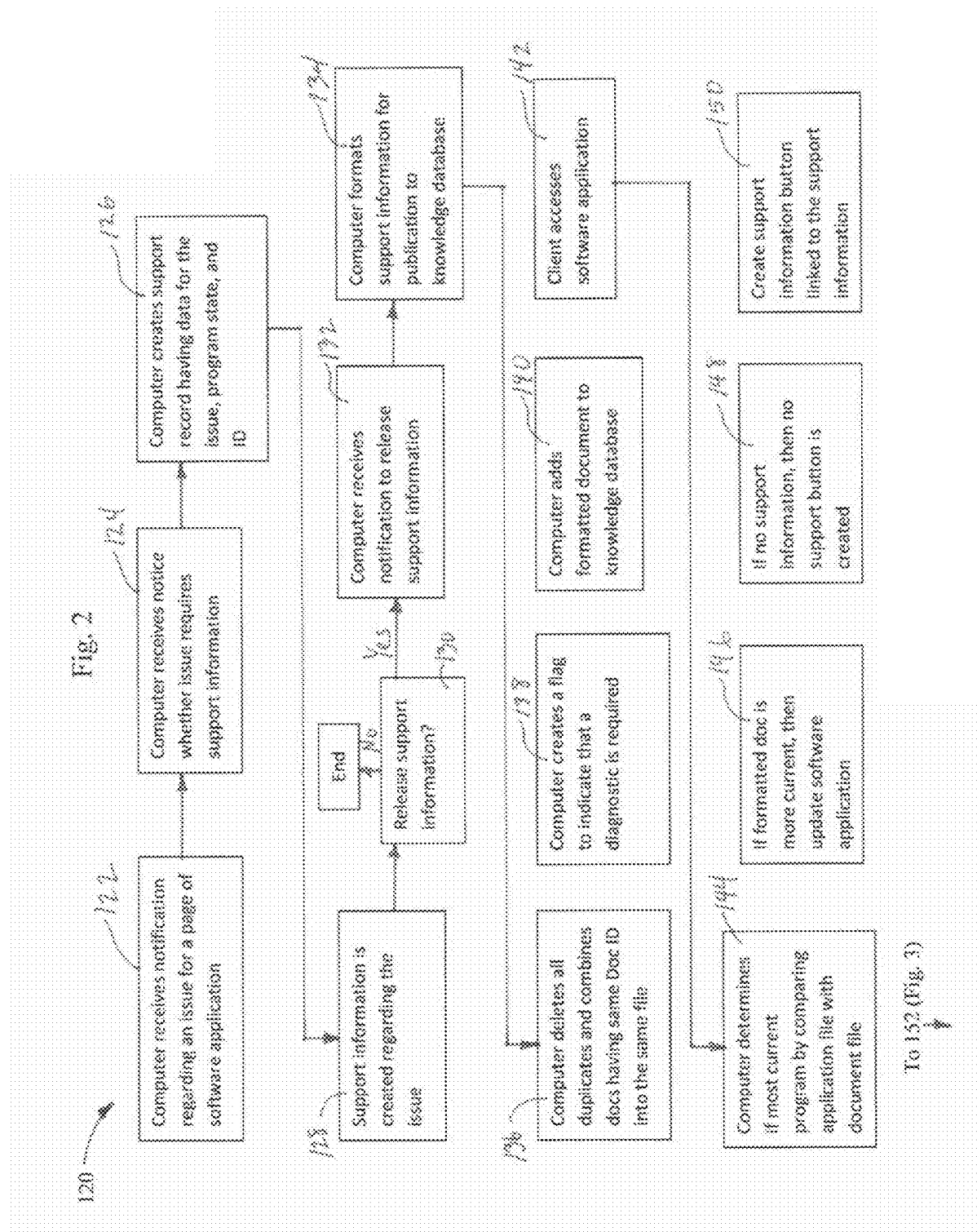
FIG. 2 is a flow chart of a computer-implemented method for generating a knowledge database for use in providing support information for a software application, according to another embodiment of the present invention.
Figure 3:
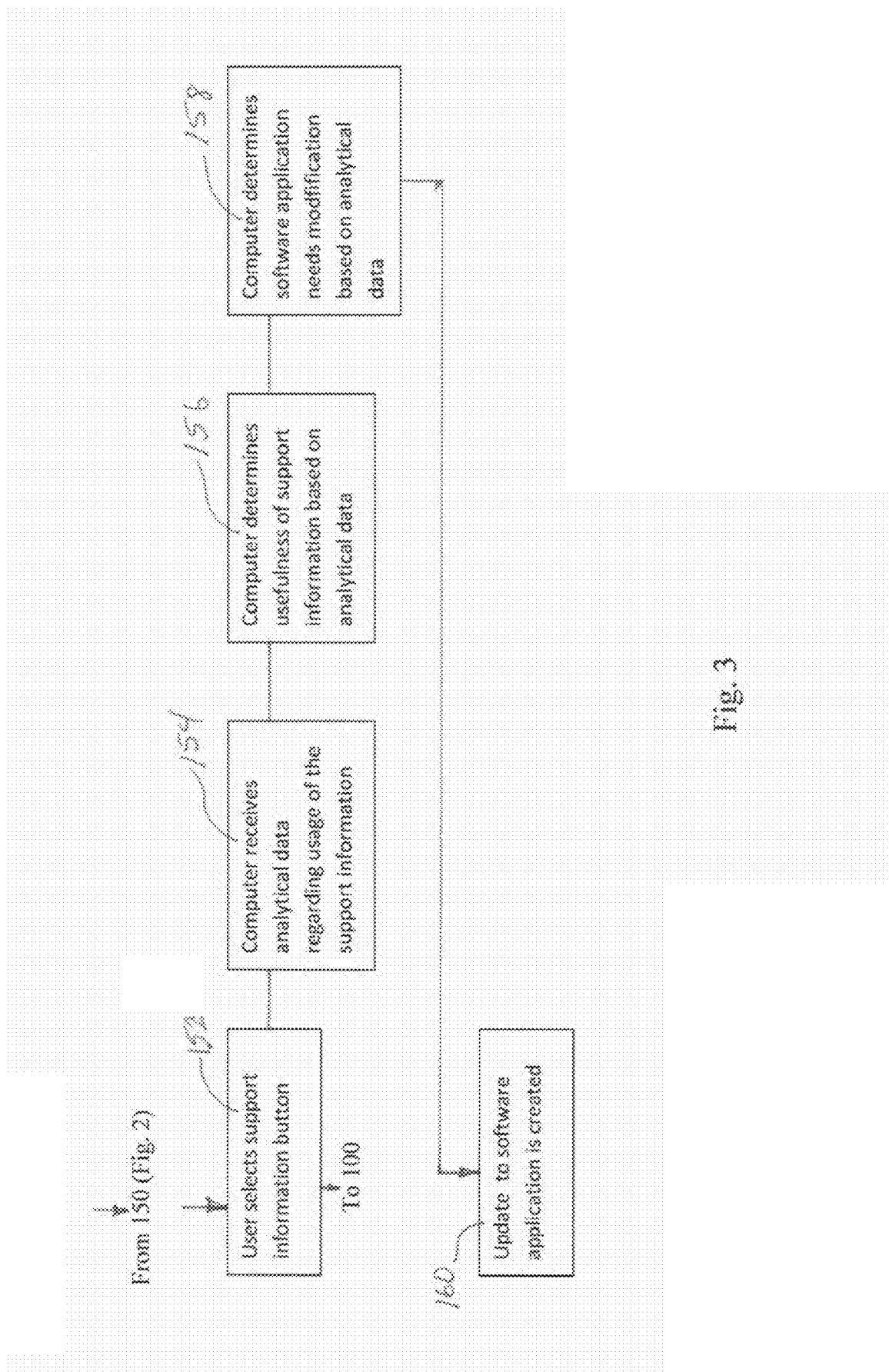
FIG. 3 is a continuation of the flow chart of FIG. 2.

Turning now to FIGS. 2-3, a computer-implemented method 120 for generating the knowledge database and support buttons for use with the method 100 described above, is shown. The computerized method 120 is implemented on a knowledge database computer which is configured to perform the method 120. The knowledge database computer may be part of the system 200 shown in FIG. 11, and described in more detail below. The knowledge database computer may be a different computer than the computer described above for method 100, or it may be the same computer used for method 100.

The method 120 comprises a step 122, in which the knowledge database computer receives a notification regarding a page (e.g. a particular field or item on a page) of the software application. The notification may be identification of an issue or possible defect in the software application, a recommendation, help information, a question, discussion, or other information regarding the page. The notification may be received from a user of the software application, a customer support representative for the software application, or other suitable source. For example, the software application may have a link, button or selection to contact customer support. Upon selecting the contact link, button or selection, the user is provided with a form to send a communication to customer support for the software application. The user enters the information regarding the page, and then the information is transmitted to the knowledge database computer which receives the notification and information.

At step 124, the knowledge database computer receives a notice from an analyst or customer support representative as to whether the issue requires support information to be added to the knowledge database. The analyst may review the issue notification, and then determine whether the issue requires support and/or support information regarding the issue should be added to the knowledge database. If the knowledge database computer receives notice that the issue requires support information to be added to the knowledge database, then, at step 126, the knowledge database computer creates a record having data regarding the issue, the program state (such as the software application release identification (number), and an identification of the record (such as a unique number or alphanumeric). If the issue does not require any further action, then is may be stored and no further action is taken.

At step 128, support information is created regarding the issue. The support information may be created by a customer support representative, an analyst or other personnel. The support information may be any of the types of support information described herein, such as help information, instructions for using the software application, notices of errors or defects in the software application, hints and advice for using the software application, articles regarding the software application, user comments regarding the software application, etc.

At step 130, a determination is made whether to release the support information to the knowledge database. If the support information is to be released to the knowledge database, then at step, the knowledge database computer receives a notification that the support information will be released for publication to users of the software application. The decision whether to release the support information may be made by customer support, or other suitable personnel.

At step 134, the knowledge database computer formats the support information into a document suitable for adding the support information to the knowledge database. For example, the support information may be inserted into an XML (Extensible Markup Language) document, and may include other document and issue data which related the support information to the issue, such as year, version, module, program, container ID (identification), document ID, field ID, date and time. Some of the formatted document data may be assigned by customer support, such as the document ID.

At step 136, the knowledge database computer analyzes the formatted documents (e.g. XML docs), and automatically deletes all duplicates and also combines documents having the same document ID into a single file. The combination combines support information for the same issue into a single file for access by the knowledge database computer. At step 138, the knowledge database computer may also create a flag to the users indicating that there is an issue with the software application that may require them to run a diagnostic within the software application to identify whether the issue will affect the proper function of the software application. The users may be advised of the flag by a notification, such as an email, a notice within the software application during an error check function or other function, or other suitable notification.

At step 140, the knowledge database computer adds the formatted document having the support information to the knowledge database. The knowledge database may be a local storage device, or it may be a web hosting server, in which case the knowledge database computer transmits the formatted document to the web hosting server.

At step 142, the client (user) access the software application. At step 144, the computer (either the application computer or the knowledge database computer) determines if the most current program is being run by comparing the current program file with the formatted document file in the knowledge database (such as the file on the web server host). If the computer determines that the formatted document (with the support information) is more current than the current version of being used by the user, then the computer downloads the most current update to the software application.

At step 146, the update to the software application creates or adds a support button for the page regarding the support information. The support button is linked to the support information, such as by the support button referencing to the document ID of the formatted document. Also, if a diagnostic flag was created at step 138, the update can also include the diagnostic flag. At step 148, if there is no support information for a support button in the software application, then no support button is created. Similarly, if an issue was resolved or a defect was corrected in an update to the software application, the support information for the issue or defect may be deleted from the knowledge database, or marked as blank or resolved. The computer may determine that the support information file is blank or resolved, and the support button that previously linked to such support information may be deleted or not created. At step 150, if there is currently no support button for the page, then a support button is created which is linked to the support information.

At step 152, the user selects the support button related to the issue and the computer receives an indication that the support button was selected. At this point, the application computer performs the method 100, as described above.

At step 156, the users' access of the support information in the knowledge database is analyzed using an analytical application. The analytical application may be an application program interface (API) such as Google Analytics, or other suitable analytical application. At step 154, the knowledge database computer receives analytical data regarding the users' access of the support information in the knowledge database, such as the number of times each formatted document having support information is accessed, the number of repeat time accessed by the same user, and the amount of time spent by each user accessing the formatted document. This data can be used to determine the usefulness of the support information. For instance, if the support information is accessed many times, or is repeatedly accessed by the same users, or the users spend a lot of time reviewing the support information, this can indicate that the support information is unclear, does not answer all of the users' questions regarding the subject matter of the support information, or that a modification to the software application is required.

At step 156, the knowledge database computer analyzes the analytical data and determines the usefulness of the support information based at least in part on the analytical data. If the analysis indicates that the support information should be improved, then the support information in the knowledge database is updated. For example, customer support may re-write the support information to make it clearer, or include additional useful information regarding the issue of the support information.

At step 158, the knowledge database computer also determines whether a modification to the software application is needed. For instance, if the analytical data indicates that a particular function in the software application is creating errors or causes excessive confusion to the users, then the computer may provide a notification that the software application should be improved. Then, at step 160, the software application is modified and an update to the software application is created. The computer notifies the users of the update to the software application, and the user may update the software application as required.

Figure 11:
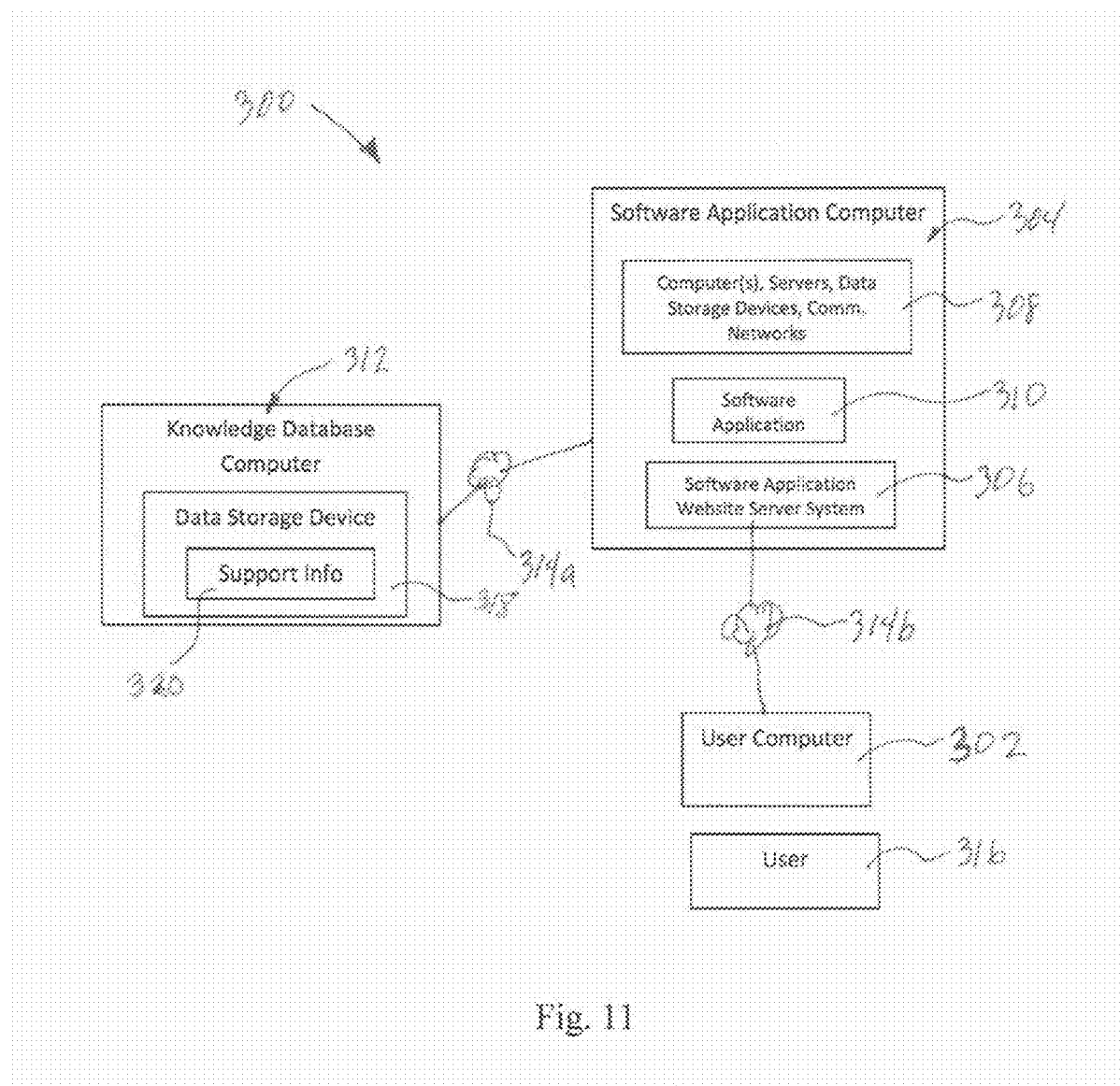
FIG. 11 illustrates a system for providing support information for a software application, according to still another embodiment of the present invention.

Referring now to FIG. 11, a non-limiting example of a system 300 that may be used to implement the methods 100 and 120 shown in FIGS. 1 and 2-3, as well as any other method embodiments described herein, is shown. It should be understood that not all of the components of the system 300 are needed to implement the methods 100 and 120, and therefore, the system may include only those components necessary to perform the method embodiments as described herein. For example, as described above, the system may include just a user computer 302 software application having a local software application programmed and configured to implement the method embodiments as described herein.

Figure 12:
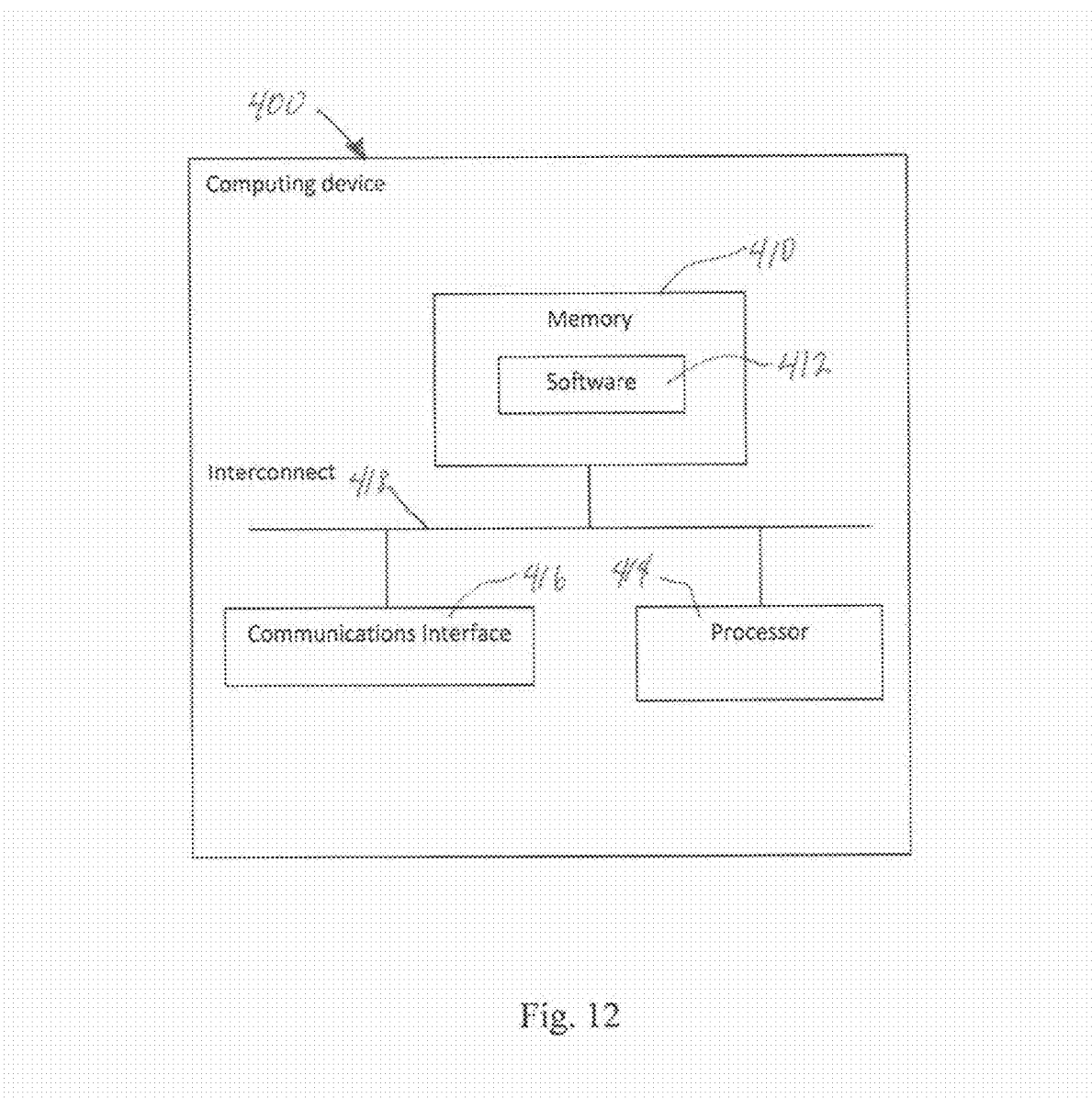
FIG. 12 is a block diagram of a computing device (computer) which may be utilized in the system of FIG. 11.

FIG. 12 generally shows a block diagram of the components of an example of a computer (computing device) 400 that may be used as the computer in the computers and servers identified in the system 200 of FIG. 11, such as the user computer 302, the software application computer system 304, and the website server 306. The computer 400 includes a memory 410, a tax preparation application software 412, a processor or controller 414 to execute the application software 412, a network or communications interface 416, e.g., for communications with a network or interconnect 418 between the components. The memory 410 may be or include one or more of cache, RAM, ROM, SRAM, DRAM, RDRAM, EEPROM, SDRAM and other types of volatile or non-volatile memory capable of storing data. The processor unit 314 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 418 may include a system bus, LDT, PCI, ISA, or other types of buses, and the communications or network interface may, for example, be an Ethernet interface, a Frame Relay interface, or other interface. The network interface 416 may be configured to enable a system component to communicate with other system components across a network which may be a wireless or various other networks. It should be noted that one or more components of computing device 400 may be located remotely and accessed via a network. Accordingly, the system configuration provided in FIG. 12 is provided to generally illustrate how embodiments may be configured and implemented.

The system 300 comprises a software application computer system 304 having hardware 308 including one or more computers, storage servers, and electronic communication networks. The software application computer system 304 has software and programming 310 (e.g. tax preparation application or personal finance management application) configured to perform the methods 100 and 120 described above, and any other method embodiments described herein, as described above.

The software application computer system 304 is in communication with a knowledge database computer 312 via a communication network 314a. The knowledge database computer 312 includes a data storage device 318 having support information 320, such as the formatted documents (e.g. XML) having support information. As explained above, the knowledge database computer may be separate from the software application computer or it may integrated with the software application computer onto the same computer system.

The software application computer 304 may also have, or function as, a software application website server system 306. The software application website server system 306 hosts a website accessible by a user 316 on the user computer 302 or other internet connected device such as a smartphone, mobile phone, etc., via the a communication network 312b. For example, the computer 302 can have an internet connection and the communication network 314b may be the internet. The website server system 306 comprises one or more computers, data storage servers and a website server which is in communication with the internet 314b. The website server system 306 and software application 310 are programmed to perform the steps of any of the methods 100 and 120, as well as any other method embodiments described herein. Accordingly, the website server 306 includes pages, files and programming to interact with, and display web pages on, an internet-connected device such as computer 302 of the user 316 through the internet 314b. The user 316 accesses and utilizes the website server system 306 through the computer 302 connected to the internet 314b using a web browser. The website server 306 may be a collection of servers in operable communication with each other in which at least one of the servers is connected to the internet 314b. The website server system 306 may be integrated with the other components of the tax return system 304, or it may a separate, stand-alone system networked to the tax return system 304 through a communication network such as 314a or 314b.

Each of the networks 314a-b (generally referred to as network 212) may be different, or two or more networks 314 may be the same depending on the system configuration and communication protocols employed. One or more or all of the networks 314 may be, for example, a cellular network, a wireless network, a Local Area Network (LAN) and/or a Wide Area Network (WAN). Thus, reference to a network 314 generally is not intended to refer to a specific network or communications protocol, and it should be understood that embodiments can be implemented using various networks and combinations thereof.

Accordingly, the system 300 is configured to perform at least one of the method embodiments of the present invention, including methods 100 and 120, as described above. For example, the user 316 may execute the software application and obtain support information as according to the method 100. Moreover, the knowledge database computer 312 and software application computer 304 may be used to generate and update a knowledge database according to the method 120.

The methods 100 and 120 shown in FIGS. 1 and 2-3, as well as other method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform a the described methods. The computer program carrier is readable by a computer and embodies instructions executable by the computer to perform the method steps of programming a computer to perform the methods 100 and 120, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A computer-implemented method for providing support information for a software application, the method being performed on a computer, comprising:
   generating a knowledge database regarding a page of the software application displayable on a display, by a method comprising:
      a knowledge database computer receiving a notification from a user that an issue exists with the page of the software application, including a description of the issue;
      the knowledge database computer receiving support information as created by a customer support representative related to the issue in response to the notification from the user;
      the knowledge database computer receiving a notification that the support information will be released for publication to users of the software application;
      the knowledge database computer adding the support information to the knowledge database; and
      linking the support information to a support button displayable on a page of the software application;
   the computer generating the page of the software application, the page including a support button displayed directly on the page;
   in response to a selection of the support button, the computer accessing support information from the knowledge database regarding the page, the knowledge database not a part of the software application;
   the computer generating a support page displayable on the display which includes the information from the knowledge database;
   modifying the software application to correct the issue and creating an update to the software application in which the support button for the defect has been removed;
   the computer sending a notification to the user to update the software application in which the support button has been removed.

2. The method of claim 1, wherein the computer sends the notification to the user when the user accesses the page of the software application.

3. The method of claim 1, wherein the support button on the page is generated by a method comprising:
   receiving a notification from a user that an issue exists with the page of the software application;
   receiving support information as created by a customer support representative related to the issue;
   receiving a notification that the support information will be released for publication to users of the software application;
   adding the support information to the knowledge database; and
   creating an update to the software application in which a support button is added to the page; and
   linking the support information to the support button.

4. The method of claim 1, wherein the computer is a user computer and the software application is running on the user computer.

5. The method of claim 1, wherein the computer is a server system, which is accessible through a communication network.

6. The method of claim 5, wherein the server system is a website hosting server.

7. The method of claim 1, wherein the knowledge database computer is one of the same computer as the computer or is integrated with the computer.

8. The method of claim 1, wherein the knowledge database computer is a separate computer from the computer.

9. A computer-implemented method for providing support information for a software application, the method being performed on a computer, comprising:
   generating a knowledge database regarding a page of the software application displayable on a display, by a method comprising:
      a knowledge database computer receiving a notification from a user that an issue exists with the page of the software application, including a description of the issue;
      the knowledge database computer receiving support information as created by a customer support representative related to the issue in response to the notification from the user;
      the knowledge database computer receiving a notification that the support information will be released for publication to users of the software application;
      the knowledge database computer adding the support information to the knowledge database; and
      linking the support information to a support button displayable on a page of the software application;
   the computer generating the page of the software application, the page including a support button displayed directly on the page;
   in response to a selection of the support button, the computer accessing support information from the knowledge database regarding the page, the knowledge database not a part of the software application;
   the computer generating a support page displayable on the display which includes the information from the knowledge database;
   receiving analytical data regarding usage of the support information by users of the software application, the analytical data including data which can be utilized to determine the usefulness of the information to users;

determining the usefulness of the support information to users of the software application based at least in part on the analytical data; and updating the support information in the knowledge database based on the determination of the usefulness of the support information.

10. The method of claim 9, wherein the analytical data is data regarding characteristics of access to a website providing the support information to users through the internet, the characteristics including number of times accessed, number of repeat times accessed by the same user, and amount of time spent by each user accessing the support information.

11. The method of claim 9, wherein the computer is a server system, which is accessible through a communication network.

12. The method of claim 11, wherein the server system is a website hosting server.

13. The method of claim 9, wherein the knowledge database computer is one of the same computer as the computer or is integrated with the computer.

14. The method of claim 9, wherein the knowledge database computer is a separate computer from the computer.

15. A system for providing support information for a software application, the method being performed on a computer, comprising:

a computer system comprising at least one computer, the at least one computer being programmed and configured to perform a process comprising:

generating a knowledge database regarding a page of the software application displayable on a display, by a process comprising:

receiving a notification from a user that an issue exists with the page of the software application;

receiving support information as created by a customer support representative related to the issue;

receiving a notification that the support information will be released for publication to users of the software application;

adding the support information to the knowledge database; and linking the support information to the support button;

generating a page of the software application displayable on a display, the page including a support button displayed directly on the page;

in response to a selection of the support button, accessing support information from a knowledge database regarding the page, the knowledge database not a part of the software application;

generating a support page displayable on the display which includes the information from the knowledge database;

modifying the software application to correct the issue and creating an update to the software application in which the support button for the issue has been removed; and the at least one computer sending a notification to the user to update the software application in which the support button has been removed.

16. The system of claim 15, wherein the at least one computer sends the notification to the user when the user accesses the page of the software application.

17. A system for providing support information for a software application, the method being performed on a computer, comprising:

a computer system comprising at least one computer, the at least one computer being programmed and configured to perform a process comprising:

generating a knowledge database regarding a page of the software application displayable on a display, by a process comprising:

receiving a notification from a user that an issue exists with the page of the software application;

receiving support information as created by a customer support representative related to the issue;

receiving a notification that the support information will be released for publication to users of the software application;

adding the support information to the knowledge database; and linking the support information to the support button;

generating a page of the software application displayable on a display, the page including a support button displayed directly on the page;

in response to a selection of the support button, accessing support information from a knowledge database regarding the page, the knowledge database not a part of the software application;

generating a support page displayable on the display which includes the information from the knowledge database;

wherein the support button on the page is generated by creating an update to the software application in which the support button is added to the page.

18. A system for providing support information for a software application, the method being performed on a computer, comprising:

a computer system comprising at least one computer, the at least one computer being programmed and configured to perform a process comprising:

generating a knowledge database regarding a page of the software application displayable on a display, by a process comprising:

receiving a notification from a user that an issue exists with the page of the software application;

receiving support information as created by a customer support representative related to the issue;

receiving a notification that the support information will be released for publication to users of the software application;

adding the support information to the knowledge database; and linking the support information to the support button;

generating a page of the software application displayable on a display, the page including a support button displayed directly on the page;

in response to a selection of the support button, accessing support information from a knowledge database regarding the page, the knowledge database not a part of the software application;

generating a support page displayable on the display which includes the information from the knowledge database;

receiving analytical data regarding usage of the support information by users of the software application, the analytical data including data which can be utilized to determine the usefulness of the information to users, and wherein the analytical data is data regarding characteristics of access to a website providing the support information to users through the internet, the characteristics including number of times accessed, number of repeat times accessed by the same user, and amount of time spent by each user accessing the support information;

determining the usefulness of the support information to users of the software application based at least in part on the analytical data; and updating the support information in the knowledge database based on the determination of the usefulness of the support information.

19. A computerized method of generating a support information database having support information regarding a page of a software application, the support information being accessible by selecting a support button on a page of the software application, the method being performed on a computer, the method comprising:

the computer receiving a notification that an issue exists with the page of the software application;

the computer receiving support information created by a customer support representative related to the issue;

the computer receiving a notification that the support information will be released for publication to users of the software application;

adding the support information to the knowledge database;

linking the support information to the support button;

modifying the software application to correct the issue and creating an update to the software application in which the support button for the issue has been removed; and the computer sending a notification to the user to install the update to the software application in which the support button has been removed.

20. The method of claim 19, further comprising:

when the issue has been corrected by an update to the software application, the computer sending a notification to a user to update the software application.

21. The method of claim 20, wherein the computer sends the notification to the user when the user accesses the page of the software application.

22. The method of claim 19, further comprising:

the computer receiving analytical data regarding usage of the support information by users of the software application, the analytical data including data which can be utilized to determine the usefulness of the information to users;

the computer determining the usefulness of the support information to users of the software application based at least in part on the analytical data; and the computer updating the support information in the knowledge database based on the determination of the usefulness of the support information.

23. A system for generating a support database having support information regarding a page of a software application, the support information being accessible by selecting a support button on a page of the software application, the system comprising:

a computer system comprising at least one computer, the at least one computer being programmed and configured to perform a process comprising:

receiving a notification that an issue exists with the page of the software application;

receiving support information created by a customer support representative related to the issue;

receiving a notification that the support information will be released for publication to users of the software application;

adding the support information to the knowledge database;

linking the support information to the support button;

receiving analytical data regarding usage of the support information by users of the software application, the analytical data including data which can be utilized to determine the usefulness of the information to users, and wherein the analytical data is data regarding characteristics of access to a website providing the support information to users through the internet, the characteristics including number of times accessed, number of repeat times accessed by the same user, and amount of time spent by each user accessing the support information;

determining the usefulness of the support information to users of the software application based at least in part on the analytical data; and updating the support information in the knowledge database based on the determination of the usefulness of the support information.

24. An article of manufacture comprising a non-transitory computer readable medium embodying instructions executable by a computer to execute a process for generating a support database having support information regarding a page of a software application, the process comprising:

receiving a notification that an issue exists with the page of the software application;

receiving support information created by a customer support representative related to the issue;

receiving a notification that the support information will be released for publication to users of the software application;

adding the support information to the knowledge database; and linking the support information to the support button;

receiving analytical data regarding usage of the support information by users of the software application, the analytical data including data which can be utilized to determine the usefulness of the information to users, and wherein the analytical data is data regarding characteristics of access to a website providing the support information to users through the internet, the characteristics including number of times accessed, number of repeat times accessed by the same user, and amount of time spent by each user accessing the support information;

determining the usefulness of the support information to users of the software application based at least in part on the analytical data; and updating the support information in the knowledge database based on the determination of the usefulness of the support information.

* * * * *